INVENTOR.
TORSTEN BLOMÉN

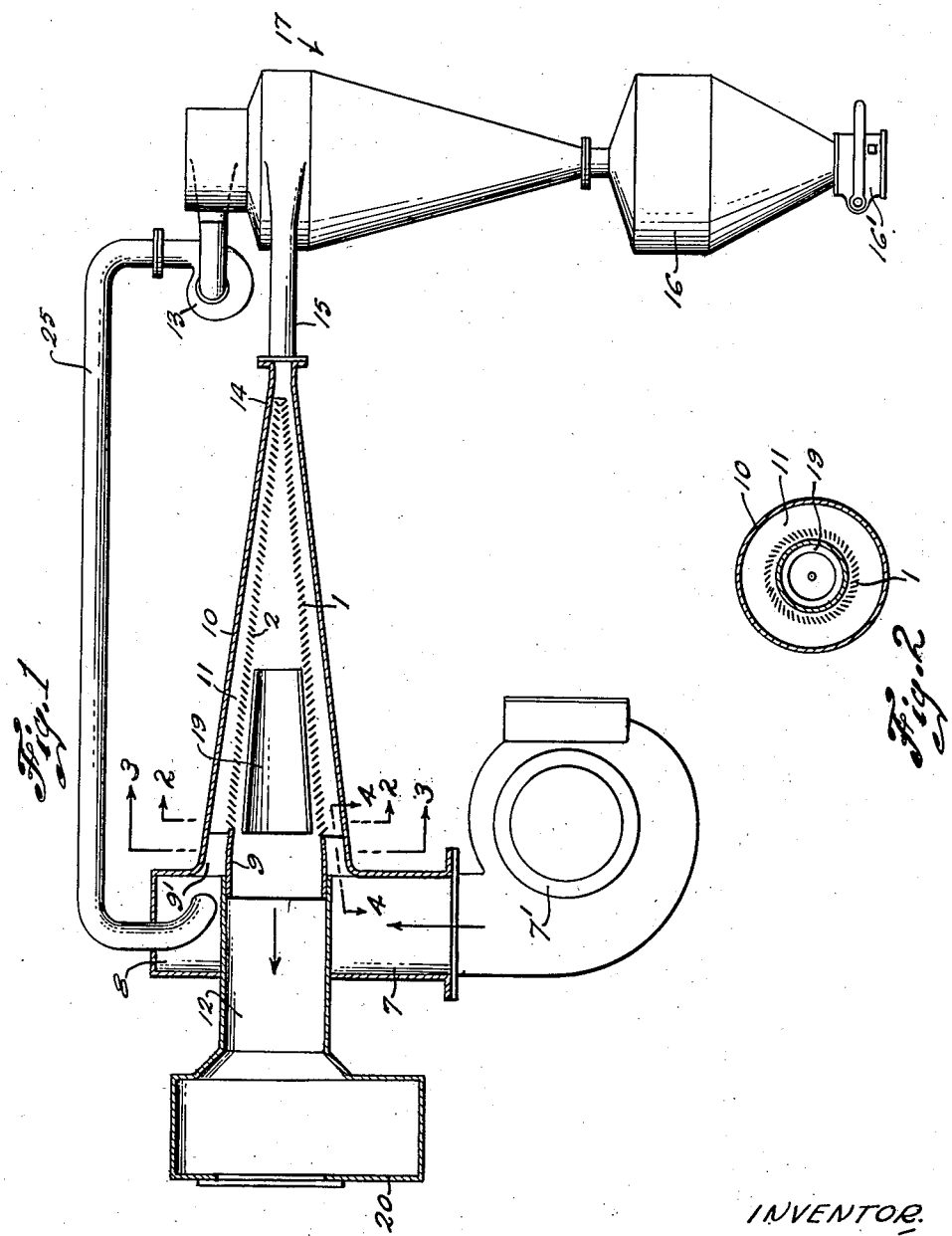

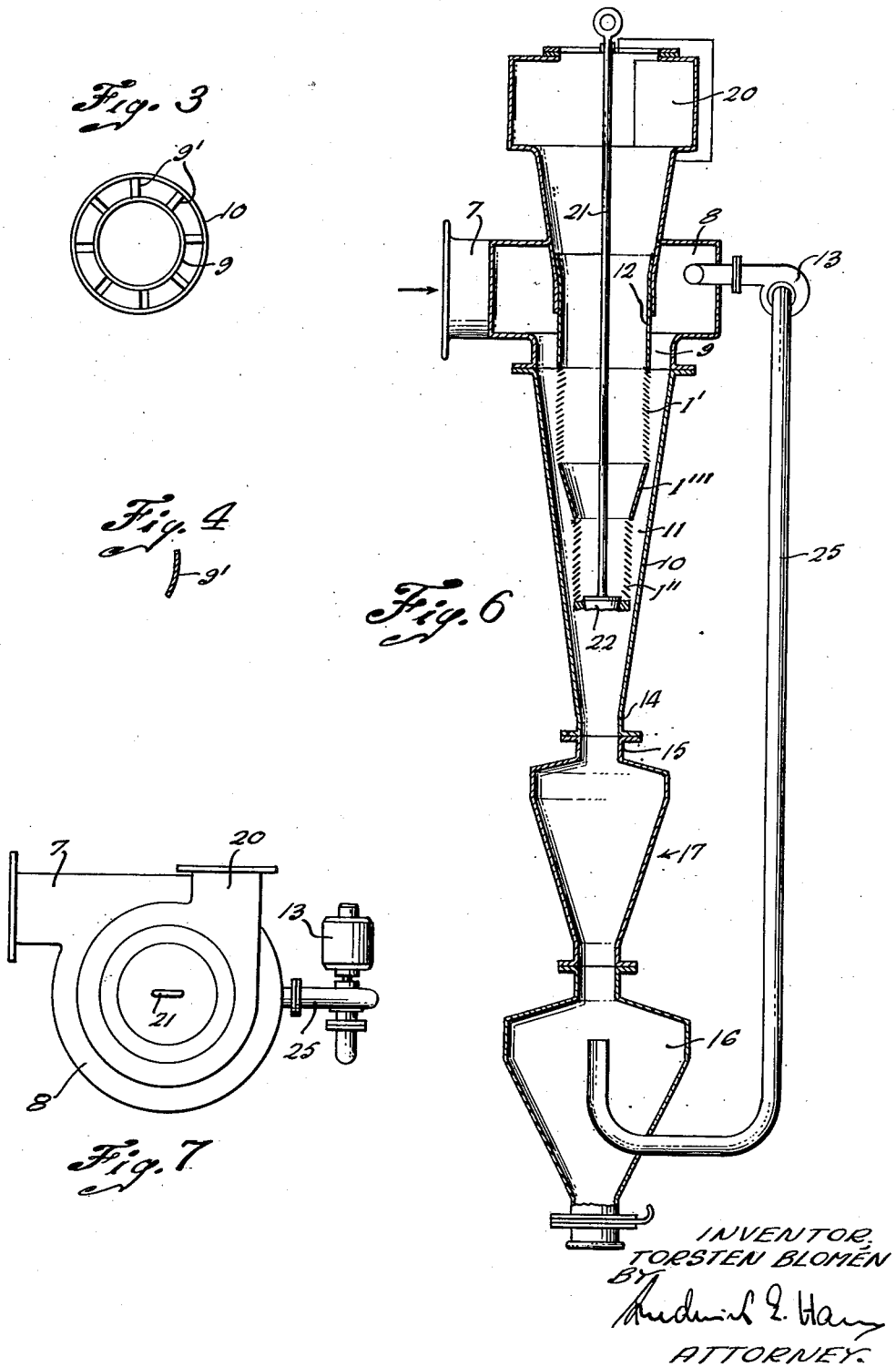

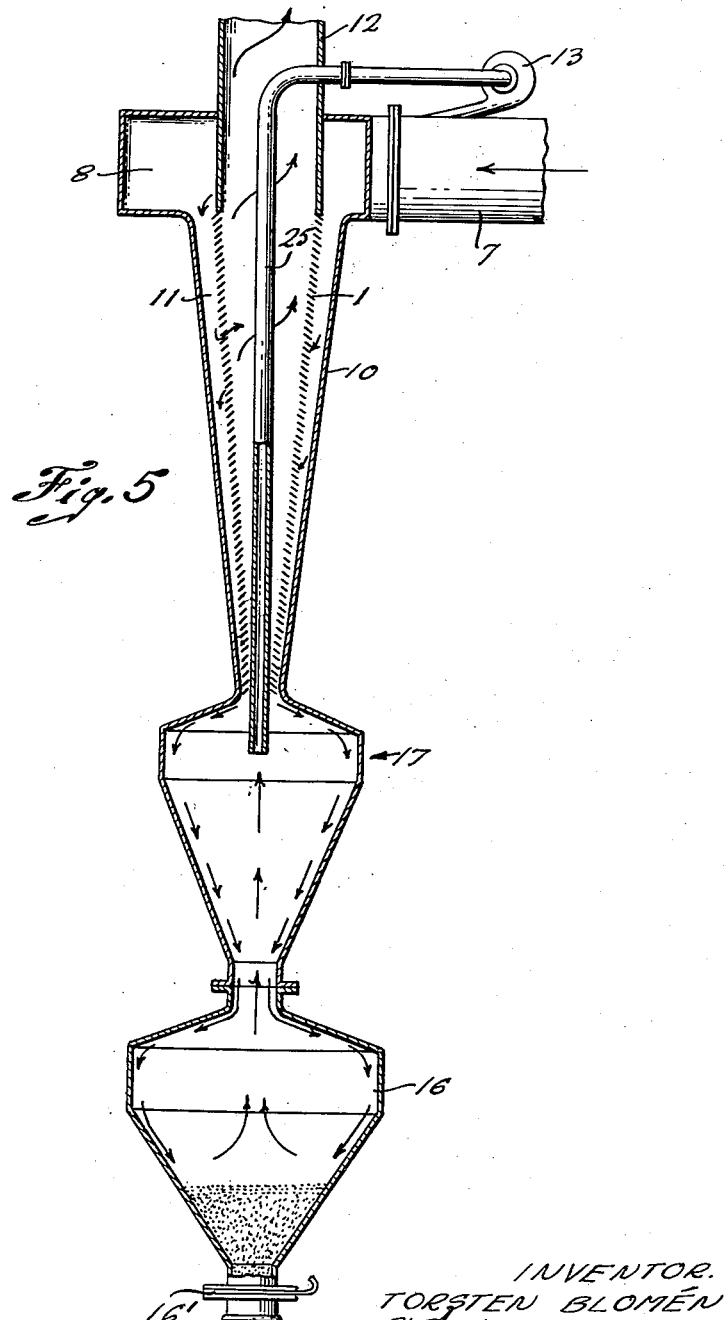

Patented Oct. 16, 1951

2,571,331

UNITED STATES PATENT OFFICE 2,571,331

APPARATUS FOR SEPARATING SOLID PARTICLES FROM GASES

Torsten Blomén, Stockholm, Sweden, assignor to Aktiebolaget Linderoths Patenter, Stockholm, Sweden Application September 11, 1948, Serial No. 48,914
In Sweden December 12, 1946

14 Claims. (Cl. 183—113)

1

This invention relates to a separator for separating solid particles, such as dust, carried in a gaseous fluid current for instance a gas current.

There are known in the art apparatus of the general types, above referred to, in which a gas current carrying solid particles is directed at an acute angle against the inner or outer wall of a perforated filter cone disposed within a housing for the purpose of separating the dust at the filter wall. The separated or purified major portion of the gas current is discharged through the filter perforations while the minor portion of the current carrying substantially all the particles separated at the filter surface is discharged from the filter cone surface.

One of the disadvantages of the apparatus, as hitherto known, is that the particle concentration increases rapidly toward the narrow filter cone end. As a result, the efficiency of separation of the filter greatly declines in the direction of the narrow filter end.

The term "filter cone," as herein used, is intended to refer to hollow bodies of rotation decreasing in diameter gradually or by steps.

One of the objects of the invention is to provide a novel and improved separator of the general type, above referred to, which has a higher efficiency of separation than was hitherto attainable.

Another object of the invention is to provide a separator of the general type, above referred to, in which the concentration of particles along the filter surface is comparatively low, such low particles concentration being favorable for a high efficiency of separation.

Another object of the invention is to provide a separator of the general type, above referred to, in which the velocity of the gas current is substantially maintained along the entire length of the filter notwithstanding the braking effect of particles separated at the filter surface upon the current velocity. This object is attained by imparting to the gas current a spiral movement from the wide filter cone end toward the narrow cone end.

Another object of the invention is to provide a separator of the general type, above referred to, in which particles already separated at the outside of the filter are catapulted away from the filter to a certain extent by the effect of the centrifugal force affecting the particles. This effect becomes the more pronounced, the more the filter cone diameter decreases toward the narrow filter end.

Other objects, features and advantages of the invention will be pointed out hereinafter and set forth in the appended claims forming part of the application.

In the accompanying drawings several now preferred embodiments of the invention are shown by way of illustration and not by way of limitation.

In the drawings:

Fig. 1 is a sectional view of a separator according to the invention.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a sectional view of a modification of a separator according to the invention.

Fig. 6 is a longitudinal sectional view of another modification according to the invention.

Fig. 7 is a top plan view of Fig. 6.

Figure 8:
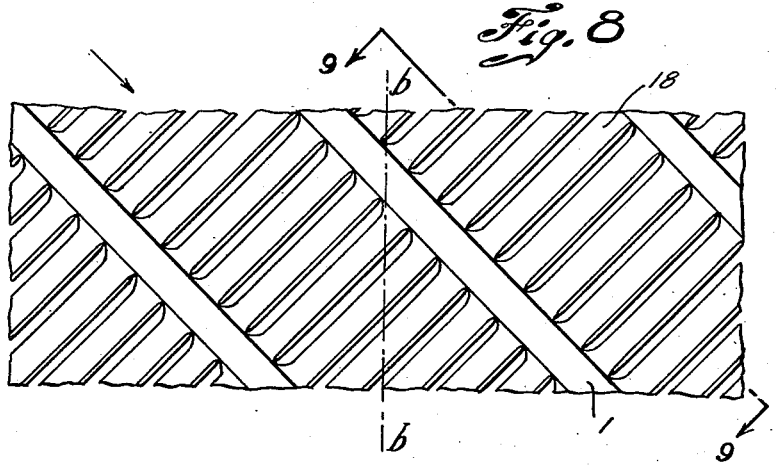
Fig. 8 is a development of part of the filter cone surface in plan view on an enlarged scale.

Theory and practical tests show that it essential for an efficient separation to maintain the velocity of the gas current along the entire filter surface. Experiments with a conventional separator show that, by reason of the increasing dust concentration toward the outlet, the velocity of the gas current more and more declines resulting in a corresponding decrease in the efficiency of separation. From this result, the conclusion can be drawn that it is desirable to maintain, as previously mentioned, a low dust concentration on the filter surface to attain a high efficiency of separation.

It will be apparent that a low dust concentration could be obtained by increasing the cross-sectional area at the narrow filter end.. However, such an arrangement has the important disadvantage that the volume of the secondary gas carrying the deposited dust must also be increased to maintain the velocity of the gas current required for the precipitation of the dust. Increase of the secondary gas in turn affects adversely the final separation of the dust.

The previously explained disadvantages of conventional separators are eliminated by providing a separator according to the invention, as shown in Fig. 1 and the companion Figs. 2, 3 and 4.

The separator according to Fig. 1 comprises a filter cone 1 disposed within a conical housing 10 mounted coaxially with the filter cone, so that a space or channel 11 between the filter cone and the housing is gradually reduced in cross-sectional area toward the narrow filter cone end. The wide end of the housing is continued in a chamber 8 communicating with an inlet 7 and a blower 7' for the gas current carrying the dust particles to be separated. Between the wide end and the narrow end of the filter cone, prefereably near the wide end of the cone, there are provided means for imparting to the gas current a spiral movement progressing toward the narrow filter end. As can best be seen on Figs. 3 and 4, these means comprise an open sleeve 9 supporting a plurality of blades 9' spaced about sleeve 9 and disposed at an angle imparting the desired spiral movement as to the gas current.

As a result of the declining radius of the gas current (by reason of the decreasing diameters of the housing cone and the filter cone) flowing along the filter surface, it is now possible to maintain the desired velocity of the gas current along the entire filter surface notwithstanding the braking effect of the dust particles separated at the filter surface. As it is well known, the tangential velocity at each point is inversely proportional to the distance between each point and the axis of the spiral current assuming a centripetal spiral or eddy curret free of friction. According to the invention the centripetal eddy current is employed to compensate for the braking effect normally caused by dust separated at the filter surface and increasing in quantity toward the narrow end of the filter cone. The provision of the conical housing 10 has the additional effect that the axial component of velocity of the gas current is maintained to the desired extent along the entire filter surface.

The spiral movement of the gas current toward the narrow filter cone end, as provided according to the invention, has also the advantage that an ever increasing portion of the dust already separated at the filter surface and carried along the same toward the narrow cone end is subjected to a centrifugal force away from the filter surface. As a result, the layer of the gas current adjacent to the filter surface is never compelled to carry heavy dust concentrations. Consequently, the velocity of the gas current is maintained sufficiently high along the entire filter surface, thereby also maintaining a high efficiency of separation of the filter along the entire filter surface.

The purified or separated major or primary portion of the gas current is discharged through an outlet 12 mounted in alignment with the wide filter cone end while the minor or secondary portion of the gas current carrying substantially all the dust particles is discharged through an outlet 14 disposed in alignment with the narrow filter cone end. Outlet 14 communicates with a discharge pipe 15. A pump 13 serves to suck the separated gas from space or channel 11 through outlet 14 and pipe 15. The secondary gas is passed into a secondary separator, generally designated by 17. The secondary separator which may be of conventional design serves to separate the dust particles carried by the secondary gas current. The separated particles are collected in a receptacle 16 from which they may be discharged through a conventional discharge opening 16', and the secondary gas, more or less purified, is forced by pump 13 through a return pipe 25 back into chamber 8.

As can best be seen on Fig. 2, the perforations of the filter cone are confined by tongues slanted relative to the filter axis as will be more fully explained hereinafter.

The major primary gas portion leaving the filter cone through outlet 12 is finally discharged through a discharge conduit 20 disposed tangentially relative to outlet 12 for the purpose of recuperating the gas pressure.

The modification according to Fig. 5 is similar in principle to the embodiment according to Figs. 1 to 4 with the exception that secondary separator 17 is connected directly to the narrow end of housing 10 adjacent to the narrow filter cone end. Furthermore, the secondary gas return conduit 25 is disposed within the housing and the filter cone coaxially therewith.

The spiral movement of the gas current, caused according to Fig. 1 by providing guide blades 9', is effected according to Fig. 5 by disposing inlet 7 tangentially relative to chamber 8.

The operation of the separator according to Fig. 5 will be apparent from the previous explanations.

As will be noted, Fig. 1 shows a horizontal arrangement of the separator and Fig. 5 a vertical arrangement. In this connection it should be mentioned that the angular position of the separator axis is not essential for the operation of the invention and that any suitable arrangement of the principal separator axis may be selected.

Figs. 6 and 7 show another modification of a vertically arranged separator. The modification according to Figs. 6 and 7 is in principle similar to the previously described modifications. As wll be noted, the return conduit 25 ends in dust receptacle 16 while according to the previously described modifications it issues in the upper part of the secondary separator. The filter cone according to Fig. 6 is shown as being composed of two cylindrical portions 1' and 1" joined by a conical portion 1'''. The diameter of filter section 1" is smaller than the diameter of filter section 1' so that in effect a conical filter is retained.

The narrow filter end 1" can be opened and closed by means of a closure plate 22 which can be operated in any suitable manner for instance by a rod 21 accessible from the outside, as can best be seen on Fig. 6.

The spiral movement of the gas current progressing toward the narrow filter end is effected in a manner similar to Fig. 5 by disposing inlet 7 tangentially relative to chamber 8. Discharge conduit 20 is also tangentially arranged for the purpose of recuperating the gas pressure.

As will appear from the previous explanations, the spiral movement of the gas current about the filter cone develops centrifugal forces about the cone which cause the static pressure at the filter surface to increase toward the wide filter cone end. If the spiral movement of the gas current would cease upon passage of the gas through the filter perforations, the static pressure within the filter cone would be approximately uniform at all points within the filter cone. As a result, the difference in pressure between the outside and the inside of the filter cone and hence the velocity and quantity of the passage of gas would increase in the direction from the narrow filter end toward the wide filter end. On the other hand, if the spiral movement could be held constant when the gas passes through the filter perforations, the centrifugal forces effective at the outside and at the inside of the filter would be in equilibrium, with the result that the velocity of the passage of gas would remain uniformly over the entire filter surface. In practice, the attitude of the flow of the gas current through the filter surface constitutes a compromise between the two previously outlined conditions. The spiral movement is partly retained when the gas passes through the filter perforations although the direction of the spiral movement is changed.

Consequently, specific and novel means according to the invention are required to secure a uniform distribution of the gas across the entire filter surface.

Figure 9:
Fig. 9 is a section taken on line 9—9 of Fig. 8.

One of the means suitable for such purpose resides in providing tongues 18 confining the filter perforations and to dispose these tongues in such a manner that the angle a between the tongues and the surface of the filter 1 decreases toward the wide filter cone end (see Figs. 8 and 9). Such an arrangement has two advantages, to wit: the total area of the filter perforations decreases per unit of filter surface, and the direction of the gas current relative to the filter surface is the more tangential the more angle a decreases. As a result, a resistance is created at the wide filter cone end which resistance tends to brake or slow the passage of the gas current through the perforations otherwise too high.

Another novel means to secure uniform distribution of the gas across the entire filter surface is to provide a frusto-conical member 19 within filter cone 1 and coaxially therewith as shown in Fig. 1. This frusto-conical member, open at both ends, serves as suction means for sucking down the gas current flowing toward the narrow filter end and also narrows the wide filter cone end near the outlet end thereof.

The most favorable separation effect is attained when the gas current can retain substantially completely its spiral movement upon passing through the filter perforations.

Figure 10:
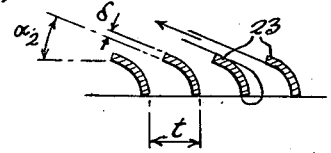
Fig. 10 is a fragmentary view showing a modification of the filter tongues.

For this purpose, it is advantageous in many instances to give a curved shape to the tongues, as shown on Fig. 10, and to select angle $a_2$ between the trailing edges of the tongues and the filter surface comparatively small so that the gas current is directed as tangentially as feasible. Angle $a_2$ however, should not be selected so small that gas flowing through one perforation collides with the tongue confining the next succeeding tongue. Preferably, angle $a_2$ is so selected that the gas current emanating from an anterior tongue just forms a tangent with the posterior tongue (Fig. 10). The condition for this relationship is that $$\sin a_2 = 0.4 + \frac{\delta}{t}$$

wherein $\delta$ is the thickness of the tongue material and $t$ the spacing between two perforations.

Figure 11:
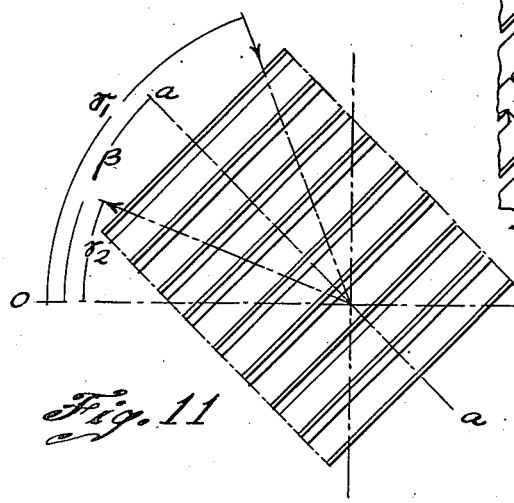
Fig. 11 shows a fragmentary view of the filter cone surface to illustrate the flow of the gas current.

For the purpose of further assisting the spiral movement of the gas current within the filter cone and hence of balancing the pressures within and outside of the filter cone, the perforations (see Fig. 11) can be so arranged and distributed that angle $\beta$ between a tangent a—a of the cone vertically to the longitudinal axes of the perforation slots and a plane 0—0 vertically to the axis of the cone is smaller than the angle $\gamma_1$ between the gas current directed against the filter surface and the said transverse plane 0—0. The gas current flowing at the inside of the filter cone then forms an angle $\gamma_2$ with the said plane 0—0 which is smaller than the angle $\gamma_1$. The result is an enlargement of the projection of the gas velocity upon the plane 0—0 and hence an increase of the component of rotation of the gas current. Consequently, a reduction in the difference $\gamma_1 - \beta$ in the direction toward the narrow cone end contributes toward a more uniform distribution of the passage of gas along the entire length of the filter surface.

Figure 12:
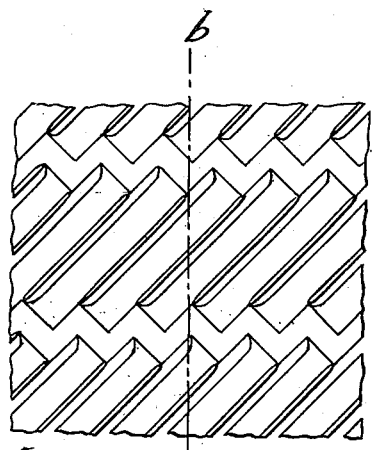
Fig. 12 is a modification of the filter cone surface shown as a plan view of a development.

Fig. 12 shows a modification of the perforated filter surface as shown in Fig. 8. According to Fig. 12, the rows of filter perforations or slots are positioned in planes vertical to the cone axis while according to Fig. 8 the rows of filter perforations constitute acute angles with the generant of the filter cone.

Another novel means to secure uniform distribution of the gas across the entire filter surface is to select the ratio between the diameter of the narrow cone end and the diameter of the wide cone end so that this ratio is approximately equal to the relation between the rotating component of the gas velocity and the gas velocity component parallel to the generant of the cone at the wide end thereof.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. In a a separator for separating solid particles suspended in a particle laden gas current, the combination of a housing having a gas inlet and two continuously open gas outlets, an elongated substantially rigid filter duct having a louvered wall in form of a generated surface, said duct being mounted within said housing, the louvered openings in the filter duct wall being in form of slots, the axes of said slots forming acute angles with the generant of the filter duct wall, said duct decreasing in cross-section from one end toward the other, the inner housing wall and the outer duct wall being shaped and positioned to define an annular channel decreasing in cross-sectional area toward the narrow duct end, the wide duct end communicating with one of said outlets, the other outlet being positioned adjacent to the narrow duct end, said gas inlet being disposed adjacent to the wide duct end at the outside thereof and in communication with said channel, and guide means within the housing positioned and arranged to impart to a particle laden gas current admitted through said gas inlet a flow direction spirally progressing through said channel and toward the narrow end of the duct, the major portion of a gas current passing through the louvered duct wall and being continuously discharged from the outlet connected with the wide duct end, the minor current portion carrying substantially all the particles continuing along the outer duct wall and being continuously discharged through the other outlet.

2. In a separator for separating solid particles suspended in a particle laden gas current, the combination of an elongated housing decreasing in cross-section toward one end thereof, said housing having a gas outlet at the narrow end thereof and a gas inlet and a second gas outlet at the wide end thereof, an elongated substantially rigid filter duct having a louvered wall in form of a generated surface, said duct being mounted within the housing coaxially therewith, the louvered openings in the filter duct wall being in form of slots, the axes of said slots forming acute angles with the generant of the filter duct wall, said filter duct decreasing in cross-sectional area from one end to the other, the narrow housing end and the narrow duct end facing one the other, the inner housing wall and the outer duct wall defining an annular channel decreasing in cross-sectional area toward the narrow ends of the housing and the duct, a suction conduit communicating with the outlet at the narrow housing end, the other outlet communicating with the wide duct end, said gas inlet being disposed adjacent to the wide duct end at the outside thereof and in communication with said channel, and guide means within the housing positioned and arranged to impart to a particle laden gas current admitted through said gas inlet a flow direction spirally progressing through said channel along the outer duct wall and toward the narrow end of the duct, the major portion of a gas current passing through the louvered duct wall and being continuously discharged from the outlet connected with the wide duct end, the minor current portion carrying substantially all the particles continuing along the outer duct wall and being continuously discharged through the other outlet.

3. A separator as described in claim 2 wherein said housing and said filter duct are each cone-shaped.

4. A separator as described in claim 1, wherein said guide means comprise a plurality of guide blades mounted within said channel and disposed at an angle to the duct axis for imparting to a gas current flowing through said channel the aforesaid spiral movement toward the narrow duct end.

5. A separator as described in claim 1, wherein the wall of said filter duct includes louvered openings the total area of which per unit of wall surface increases toward the narrow duct end.

6. A separator as described in claim 1, wherein said slots are elongated, and wherein the slots are spaced in the direction substantially perpendicularly to the longitudinal axis of the slots, and wherein tongues slanted relative to the filter duct wall extend from the longitudinal edges of said slots.

7. A separator as claimed in claim 6, wherein at least some of said tongues are curved, the concavely curved side of the tongues facing the wide duct end.

8. A separator as described in claim 6, wherein the sine of the angle of inclination of a tongue at the trailing edge thereof is not greater than the sum of 0.4 plus the ratio between the thickness of the tongue material and the spacing between two adjacent tongues.

9. A separator as described in claim 1, in combination with a tubular guide member open at both ends and disposed within the filter duct coaxially therewith, said guide member being tapered toward the narrow end of the duct.

10. A separator as described in claim 1, in combination with a secondary separator communicating with said outlet adjacent to the narrow dust end for separating particles carried in the minor current portion discharged through the said outlet, and in combination with a conduit connecting the second separator with said housing inlet for returning purified gaseous fluid from the second separator to the said inlet, said conduit being disposed within the filter duct coaxially therewith.

11. A separator as described in claim 1, wherein at the wide filter duct end the angle $\beta$ between a tangent of the filter duct vertically to the longitudinal axes of the slots and a plane 0—0 vertically to the filter duct axis is smaller than the angle $\gamma_1$ between the direction of flow imparted to a gas current by said guide means and the said plane, the difference between the said angles decreasing toward the narrow duct end.

12. A separator as described in claim 1, wherein at the narrow filter duct end the angle $\beta$ between a tangent of the filter duct vertically to the longitudinal axes of the slots and a plane 0—0 vertically to the filter duct axis is larger than the angle $\gamma_1$ between the direction of flow imparted to a gas current by said guide means and the said plane.

13. A separator as described in claim 1, in combination with a closure member at the narrow filter duct end, and actuating means for selectively placing the closure member in a position for opening or closing the said filter duct end.

14. A separator as described in claim 1, in combination with a secondary separator communicating with said outlet adjacent to the narrow duct end for separating particles carried in the minor current portion discharged through the said outlet, said secondary separator including a receptacle for separating and collecting articles.

TORSTEN BLOMÉN.

REFERENCES CITED

The following references are of record in the file of this patent:

UNITED STATES PATENTS

| Number | Name | Date |
|---|---|---|
| 940,827 | Sheward | Nov. 23, 1909 |
| 1,107,485 | Bowser | Aug. 18, 1914 |
| 1,175,948 | French | Mar. 21, 1916 |
| 1,680,243 | Becker | Aug. 7, 1928 |
| 1,856,685 | Anderson | May 3, 1932 |
| 2,152,115 | Van Tongeren | Mar. 28, 1939 |
| 2,357,734 | Haber | Sept. 5, 1944 |

FOREIGN PATENTS

| Number | Country | Date |
|---|---|---|
| 27,280 | Great Britain | Nov. 26, 1913 |
| 562,345 | Great Britain | June 28, 1944 |
| 521,682 | Germany | Mar. 26, 1931 |